US009672055B2

(12) United States Patent
Masuda

(10) Patent No.: US 9,672,055 B2
(45) Date of Patent: Jun. 6, 2017

(54) INFORMATION PROCESSING SYSTEM HAVING TWO SUB-SYSTEMS WITH DIFFERENT HARDWARE CONFIGURATIONS WHICH ENABLE SWITCHING THEREBETWEEN

(75) Inventor: Takeshi Masuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 988 days.

(21) Appl. No.: 12/660,103

(22) Filed: Feb. 19, 2010

(65) Prior Publication Data
US 2010/0229180 A1    Sep. 9, 2010

(30) Foreign Application Priority Data

Mar. 3, 2009   (JP) ................................ P2009-049838

(51) Int. Cl.
G06F 9/46        (2006.01)
G06F 9/455       (2006.01)
G06F 9/50        (2006.01)

(52) U.S. Cl.
CPC ........ *G06F 9/45558* (2013.01); *G06F 9/5088* (2013.01); *G06F 2009/4557* (2013.01)

(58) Field of Classification Search
None
See application file for complete search history.

(56) References Cited

U.S. PATENT DOCUMENTS 7,788,522 B1 *  8/2010  Abdelaziz et al. ............ 714/4.1
7,844,713 B2 *  11/2010 Ikawa et al. .................. 709/227
2006/0155912 A1 *  7/2006  Singh et al. ........................ 711/6
2007/0142083 A1    6/2007  Cupps et al.
(Continued)

FOREIGN PATENT DOCUMENTS

JP         09274608 A      10/1997
JP      2002215597 A       8/2002
(Continued)

OTHER PUBLICATIONS

Wang et al. "Delay Analysis in Temperature-Constrained Hard Real-Time systems with General Task Arrivals", Proceedings of the 27th IEEE International Real-Time Systems Symposium, 2006.*

(Continued)

*Primary Examiner* — Wissam Rashid
(74) *Attorney, Agent, or Firm* — Chip Law Group

(57) ABSTRACT

An information processing system includes a first system and a second system. The first system and the second system each includes: hardware; a compensation section configured to provide execution environments for execution of a process using the hardware of the system to which the compensation section belongs; and a processing section configured to execute a predetermined process in the execution environments provided by the compensation section. The hardware of the first system and the hardware of the second system are different in nature from each other. The compensation section of one of the first system and the second system compensates for the differences between the hardware of the first system and the hardware of the second system to provide the processing section of the other with the execution environments which are not affected by the differences between the hardware of the first system and the hardware of the second system.

16 Claims, 12 Drawing Sheets

(56) References Cited

U.S. PATENT DOCUMENTS

2008/0104587 A1     5/2008    Magenheimer et al.
2008/0263324 A1    10/2008    Sutardja et al.

FOREIGN PATENT DOCUMENTS

| | | |
|---|---|---|
| JP | 2002288150 A | 10/2002 |
| JP | 2004126968 A | 4/2004 |
| JP | 2007148952 A | 6/2007 |
| JP | 2007323244 A | 12/2007 |
| JP | 2008257578 A | 10/2008 |

OTHER PUBLICATIONS

Rong et al. (Extending the Lifetime of a Network of Battery-Powered Mobile Device by Remote Processing: A Markovian Decision-Based Approach, ACM, Jun. 2003).*

Hisayuki M et al: "Dynamic Load Balancing Using Network Transferable Computer", Distributed Computing Systems Workshops, 2005. 25th IEEE International Conference on Columbus, OH, USA Jun. 6-10, 2005, Piscataway, NJ, USA, IEEE, Jun. 6, 2005 (Jun. 6, 2005), pp. 51-57, XP 010808036.

Hisayuki M et al: "Adaptable load balancing using network transferable computer associated with mobile IP" Distributed Computing Systems Workshops, 2003. Proceedings. 23rd International Conference on May 19-22, 2003, Piscataway, NJ . USA. IEEE, May 19, 2003 (May 19, 2003), pp. 8-13, XP 010642344.

European Search Report EP 10154514, dated Aug. 5, 2011.

microsoft.com/windows/windows-vista/features/sideshow.aspx.

Office Action from Japanese Application No. 2009-049838, dated Jan. 11, 2011.

Ariyasu Suzaki, "Implementation of the computer which can walk through networks", Institute of Electronics, Information and Communication Engineers technology memoir, Corporate judicial person Institute of Electronics, Information and Communication Engineers, May 25, 2000 vol. 100, No. 86, pp. 149-156.

Office Action from Japanese Application No. 2009-049838, dated Apr. 19, 2011.

* cited by examiner

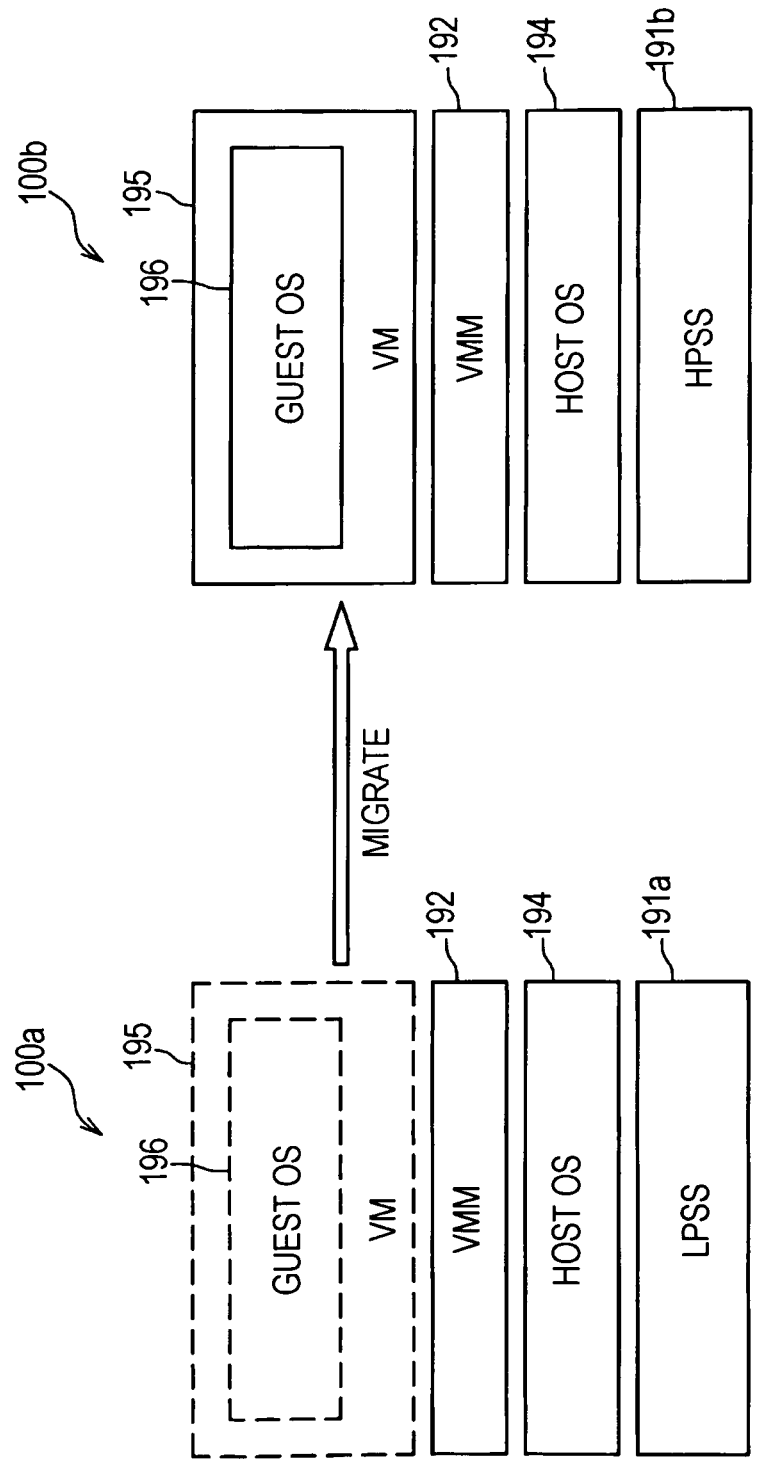

INFORMATION PROCESSING SYSTEM HAVING TWO SUB-SYSTEMS WITH DIFFERENT HARDWARE CONFIGURATIONS WHICH ENABLE SWITCHING THEREBETWEEN

CROSS-REFERENCE TO RELATED APPLICATION

The present application claims priority from Japanese Patent Application No. JP 2009-049838 filed in the Japanese Patent Office on Mar. 3, 2009, the entire content of which is incorporated herein by reference.

BACKGROUND OF THE INVENTION

1. Field of the Invention

The present invention relates to an information processing system. More specifically, the present invention relates to a technique for switching between systems to be used in accordance with circumstances.

2. Description of the Related Art

In general, a system that has a high processing capacity tends to consume a large amount of power, and a system that consumes a small amount of power tends to have a low processing capacity, for example. Also, a system that has a large number of functions tends to consume a large amount of power, and a system that consumes a small amount of power tends to have a limited range of functions, for example. Thus, there is a trade-off between a system with a high processing capacity and one that consumes a small amount of power, for example, and it is necessary to select which system is to be used depending on which of the processing capacity and the power consumption is given a higher priority. Likewise, there is a trade-off between a system that has a large number of functions and one that consumes a small amount of power, and it is necessary to select which system is to be used depending on which of the functionality and the power consumption is given a high priority over the other. Thus, it is necessary to switch between systems to be used in accordance with circumstances. In the related art, a system that includes both a system (sub system) formed by a PC (Personal Computer) that has a relatively high processing capacity and a wide range of functions and a system (sub system) formed by a device that has a limited range of functions but that consumes a relatively small amount of power is disclosed (see "Windows (registered trademark) SideShow (registered trademark)", available on the Internet at URL: http://www.microsoft.com/japan/windows/products/windows-vista/features/details/sideshow.mspx as of Feb. 26, 2009, for example.

SUMMARY OF THE INVENTION

While the technique disclosed in "Windows (registered trademark) SideShow (registered trademark)" mentioned above, for example, enables switching between systems to be used in accordance with circumstances, the respective systems provide different execution environments. For example, a particular application may not be utilized in both the systems. This may cause an inconvenience to users.

In view of the foregoing, it is desirable to provide a new and improved technique for flexibly switching between systems to be used in accordance with circumstances while maintaining the same execution environments.

According to an embodiment of the present invention, there is provided an information processing system including a first system and a second system, the first system and the second system each including: hardware, the hardware of the first system and the hardware of the second system being different in nature from each other; a compensation section configured to provide execution environments for execution of a process using the hardware of the system to which the compensation section belongs; and a processing section configured to execute a predetermined process in the execution environments provided by the compensation section, in which the compensation section of the first system compensates for the differences between the hardware of the first system and the hardware of the second system to provide the processing section of the first system with the execution environments which are not affected by the differences between the hardware of the first system and the hardware of the second system, and the compensation section of the second system compensates for the differences between the hardware of the first system and the hardware of the second system to provide the processing section of the second system with the execution environments which are not affected by the differences between the hardware of the first system and the hardware of the second system.

The first system may further include a monitoring section configured to detect occurrence of an event indicating that the system which is executing the predetermined process is to be switched from, and when the monitoring section detects the occurrence of the event during execution of the predetermined process, the processing section of the first system may extract data stored in the hardware being used in the execution of the predetermined process and generate an image file containing the extracted data to output the generated image file to the second system.

The second system further may include a monitoring section configured to detect occurrence of an event indicating that the system which is executing the predetermined process is to be switched from, and when the monitoring section detects the occurrence of the event during execution of the predetermined process, the processing section of the second system may extract data stored in the hardware being used in the execution of the predetermined process and generate an image file containing the extracted data to output the generated image file to the first system.

When the monitoring section of the first system detects the occurrence of the event during standby for the predetermined process, the processing section of the first system may receives the image file from the second system and cause the hardware of the first system to store the data contained in the received image file in order to execute the predetermined process using the hardware storing the data.

When the monitoring section of the second system detects the occurrence of the event during standby for the predetermined process, the processing section of the second system may receive the image file from the first system and cause the hardware of the second system to store the data contained in the received image file in order to execute the predetermined process using the hardware storing the data.

The hardware of the first system may have a lower processing speed during operation than the hardware of the second system, and the monitoring section of the first system may monitor a magnitude of a load being imposed on the hardware of the first system and generate the event when the magnitude of the load is larger than a predetermined value.

The hardware of the first system may have a lower processing speed during operation than the hardware of the second system, and the monitoring section of the first system may monitor an operating state of the first system and generate the event when the first system is starting up.

The hardware of the second system may have a higher processing speed during operation than the hardware of the first system, and the monitoring section of the second system may monitor a magnitude of a load being imposed on the hardware of the second system and generate the event when the magnitude of the load is smaller than a predetermined value.

The hardware of the second system may have a higher power consumption during operation than the hardware of the first system, and the monitoring section of the second system may monitor an operating state of the hardware of the second system and generate the event when the hardware of the second system is idling.

The hardware of the second system may have a higher power consumption during operation than the hardware of the first system, and the monitoring section of the second system may monitor an operating state of a battery of the second system and generate the event when the battery of the second system is driving.

The monitoring section of the first system may monitor the hardware of the first system being used by the processing section of the first system during execution of the predetermined process and generate the event in the case where a necessity to use hardware that does not exist in the first system or hardware of the first system that is faulty arises.

The monitoring section of the first system may monitor a temperature of the hardware of the first system being used by the processing section of the first system during execution of the predetermined process and generate the event in the case where the temperature is higher than a predetermined value.

The first system may further include an input section configured to receive from a user an input of switching instruction information indicating that the system which is executing the predetermined process is to be switched from, and the monitoring section of the first system may generate the event when the input section receives the switching instruction information.

According to the present invention described above, it is possible to switch between systems to be used for execution of a predetermined process in accordance with circumstances during execution of the predetermined process, and to allow a system to which the predetermined process has been transferred to resume the predetermined process at a point at which system switching is performed.

BRIEF DESCRIPTION OF THE DRAWINGS

FIG. 4 is a schematic diagram showing migration of a VM (Virtual Machine) from an LPSS to an HPSS;

DESCRIPTION OF THE PREFERRED EMBODIMENTS

Figure 1:
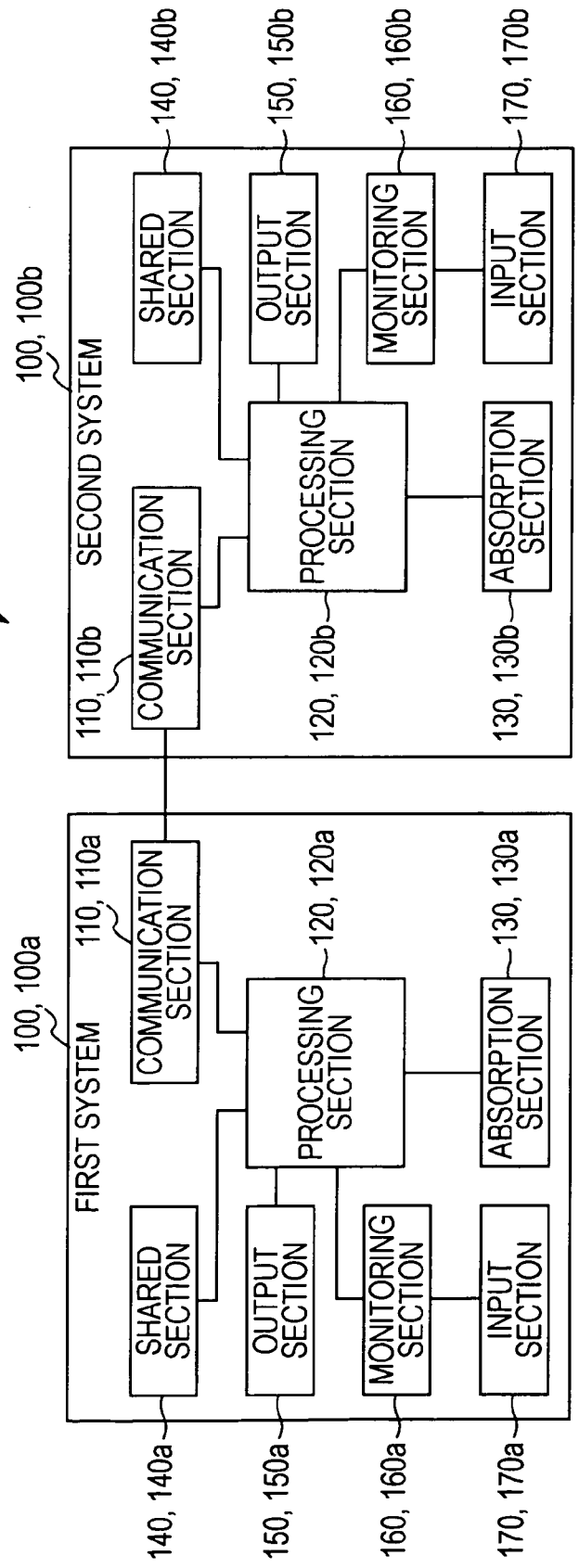
FIG. 1 shows a functional configuration of an information processing system according to an embodiment.

A preferred embodiment of the present invention will be described in detail below with reference to the accompanying drawings. In the specification and the drawings, constituent elements having substantially the same functional configuration are denoted by the same reference symbol to omit repeated descriptions. The description will be made in the following order.
1. First Embodiment
  1-1. Overview of Information Processing System
  1-2. Functional Configuration of Information Processing System
  1-3. Hardware Configuration of Sub System
  1-4. Virtualization Technology
  1-5. Virtualization
  1-6. Advantages of Virtualization
  1-7. Migration
  1-8. Dynamic Transfer of Execution Environments Employing Migration
  1-9. Constituent Elements of System Necessary for Implementation of Information Processing System
    1-9-1. Two or More Sub Systems Different in Power Consumption/Processing Capacity
    1-9-2. Communication Unit between Sub Systems
    1-9-3. Unit for Sharing HW Resource between Sub Systems
    1-9-4. Unit for Sharing VM Image between Sub Systems
    1-9-5. Switching Event Detection Function
    1-9-6. Sub System Power Control Function
  1-10. State Transition Diagram
    1-10-1. Execution of VM
    1-10-2. Standby for Migration (VM-Executing Sub System)
    1-10-3. Standby for Migration (Non-VM-Executing Sub System)
    1-10-4. Execution of Migration (VM-Executing Sub System)
    1-10-5. Execution of Migration (Non-VM-Executing Sub System)
    1-10-6. Flow of Migration
    1-10-7. Flow of Live Migration
    1-10-8. Standby for Switching
  1-11. First Exemplary System Configuration
  1-12. Second Exemplary System Configuration
  1-13. Switching from LPSS to HPSS
  1-14. First Flow of Switching
  1-15. Second Flow of Switching
  1-16. First Example of Sharing HDD for VM Image
  1-17. Second Example of Sharing HDD for VM Image 1-18. Third Example of Sharing HDD for VM Image
1-19. Fourth Example of Sharing HDD for VM Image
1-20. Fifth Example of Sharing HDD for VM Image
1-21. Case where Sub Systems Do Not Support Same Instruction Set
1-22. Future Prospect

1. First Embodiment

A first embodiment of the present invention will be described.

[1-1. Overview of Information Processing System]

An information processing system includes an LPSS (Low Power Sub System) and an HPSS (High Performance Sub System), and executes an OS (Operating System) in a virtual machine in each sub system. The information processing system dynamically migrates the virtual machine which executes a process between the LPSS and the HPSS in accordance with circumstances such as a task load and a power state. For example, the information processing system causes the HPSS to execute a process during startup and processing of a high-load task, and causes the LPSS to execute a process during battery driving, idling, and processing of a low-load task. The information processing system may be an integrated system (PC unit) having an LPSS and an HPSS provided in a single housing, or a separated system having a notebook PC (LPSS) and a dock (HPSS). The information processing system is not limited to a combination of an LPSS and an HPSS, and may be formed by any combination of two systems with different hardware configurations.

[1-2. Functional Configuration of Information Processing System]

FIG. 1 shows a functional configuration of an information processing system according to an embodiment. As shown in FIG. 1, an information processing system 10 includes two sub systems (a first system 100 (100a) and a second system 100 (100b)) with different hardware configurations. While two sub systems are provided in the embodiment, three or more sub systems may be provided.

The information processing system 10 may be formed with the first system 100 (100a) and the second system 100 (100b) provided in a single housing (for example, a notebook PC), or may be formed as a separated system including a notebook PC incorporating the first system 100 (100a) and a dock incorporating the second system 100 (100b), for example. The first system 100 (100a) and the second system 100 (100b) may be incorporated in separate housings connected via a network.

The first system 100 (100a) and the second system 100 (100b) have hardware configurations different in nature from each other. The differences between the hardware configurations may be of various natures such as, but not specifically limited to, the difference in processing speed achieved by the hardware, the difference in power consumption achieved by the hardware, the difference in input/output interface supported by the hardware, and the difference in instruction set architecture of the CPU, for example. The first system 100 (100a) includes a compensation section 130 (130a) and a processing section 120 (120a). Likewise, the second system 100 (100b) includes a compensation section 130 (130b) and a processing section 120 (120b).

The compensation section 130 is configured to provide execution environments for execution of a process using the hardware of the system to which the compensation section 130 belongs. The term "hardware" as used herein refers to various physical devices necessary to execute a process, for example various devices necessary to execute a program, such as a CPU (Central Processing Unit), a memory such as a RAM (Random Access Memory), and a storage device such as an HDD (Hard Disk Drive). The compensation section 130 is formed by a CPU, a RAM, an HDD, and so forth, and the function of the compensation section 130 is implemented by the CPU executing a VMM (Virtual Machine Monitor) read out from the HDD and loaded in the RAM, for example. The VMM is a program for providing a virtual machine (VM) to be discussed later with execution environments that are not affected by the difference in hardware, for example.

The processing section 120 is configured to execute a predetermined process in the execution environments provided by the compensation section 130. The predetermined process is not specifically limited, and may be a process performed by executing a program, for example. The type of the program is also not specifically limited, and may be a program for playing back content data, for example. The processing section 120 is formed by a CPU, a RAM, an HDD, and so forth, and is implemented by the CPU executing a program read out from the HDD and loaded in the RAM, for example. The term "program" as used herein refers to software that forms a virtual machine (VM) executed by using the VMM described above. The expression "to execute a virtual machine (VM)" means that the CPU executes software that forms a virtual machine (VM). The virtual machine (VM) will be discussed in detail later.

The compensation section 130a of the first system 100a compensates for the differences between the hardware of the first system 100a and the hardware of the second system 100b. This function may be implemented by a virtualization technology to be described later, for example. In this way, the processing section 120a of the first system 100a is provided with execution environments that are not affected by the differences between the hardware of the first system 100a and the hardware of the second system 100b.

Likewise, the compensation section 130b of the second system 100b compensates for the differences between the hardware of the first system 100a and the hardware of the second system 100b. In this way, the processing section 120b of the second system 100b is provided with execution environments that are not affected by the differences between the hardware of the first system 100a and the hardware of the second system 100b.

The first system 100a may further include a monitoring section 160a configured to detect occurrence of an event indicating that the system which is executing the predetermined process is to be switched from. In such a case, when the monitoring section 160a detects occurrence of the event during execution of the predetermined process, the processing section 120a of the first system 100a extracts data stored in the hardware being used in the execution of the predetermined process. The processing section 120a of the first system 100a generates an image file containing the extracted data to output the generated image file to the second system 100b. The term "image file" refers to a file in which data stored in hardware (such as a CPU, a RAM, and an HDD) are saved with the file and folder structure maintained. This allows the first system 100a to output the image file to the second system 100b at the time of system switching. The monitoring section 160a is formed by the CPU executing a program stored in the RAM, for example.

Likewise, the second system 100b may further include a monitoring section 160b configured to detect occurrence of an event indicating that the system which is executing the predetermined process is to be switched from. In such a case, when the monitoring section 160b detects occurrence of the event during execution of the predetermined process, the processing section 120b of the second system 100b extracts data stored in the hardware being used in the execution of the predetermined process. The processing section 120b of the second system 100b generates an image file containing the extracted data to output the generated image file to the first system 100a. This allows the second system 100b to output the image file to the first system 100a at the time of system switching. The monitoring section 160b is formed by the CPU executing a program stored in the RAM, for example.

When the monitoring section 160a detects occurrence of an event during standby for the predetermined process, the processing section 120a of the first system 100a may receive the image file from the second system 100b. The processing section 120a of the first system 100a causes the hardware of the first system 100a to store the data contained in the received image file in order to execute the predetermined process using the hardware storing the data. This allows the processing section 120a of the first system 100a to start executing the predetermined process which has been executed by the processing section 120b of the second system 100b at the time of system switching.

Likewise, when the monitoring section 160b detects occurrence of an event during standby for the predetermined process, the processing section 120b of the second system 100b may receive the image file from the first system 100a. The processing section 120b of the second system 100b causes the hardware of the second system 100b to store the data contained in the received image file in order to execute the predetermined process using the hardware storing the data. This allows the processing section 120b of the second system 100b to start executing the predetermined process which has been executed by the processing section 120a of the first system 100a at the time of system switching.

It is assumed that the hardware of the first system 100a has a lower processing speed during operation than the hardware of the second system 100b. In this case, the monitoring section 160a of the first system 100a may monitor the magnitude of a load being imposed on the hardware of the first system 100a. The monitoring section 160a may generate an event indicating that the system which is executing the predetermined process is to be switched from when the magnitude of the load is larger than a predetermined value. The predetermined value may be stored in the RAM or the HDD, for example.

In the case where the hardware of the first system 100a has a lower processing speed during operation than the hardware of the second system 100b, the monitoring section 160a of the first system 100a may monitor the state of the VM executed by the processing section 120a of the first system 100a. In such a case, the monitoring section 160a of the first system 100a may generate an event indicating that the system which is executing the predetermined process is to be switched from when the VM executed by the processing section 120a of the first system 100a is starting up.

It is assumed that the hardware of the second system 100b has a higher processing speed during operation than the hardware of the first system 100a. In this case, the monitoring section 160b of the second system 100b may monitor the magnitude of a load being imposed on the hardware of the second system 100b. The monitoring section 160b may generate an event indicating that the system which is executing the predetermined process is to be switched from when the magnitude of the load is smaller than a predetermined value. The predetermined value may be stored in the RAM or the HDD, for example.

It is assumed that the hardware of the second system 100b has a higher power consumption during operation than the hardware of the first system 100a. In this case, the monitoring section 160b of the second system 100b may monitor the operating state of the second system 100b and generate an event indicating that the system which is executing the predetermined process is to be switched from when the second system 100b is idling.

It is assumed that the hardware of the second system 100b has a higher power consumption during operation than the hardware of the first system 100a. In this case, the monitoring section 160b of the second system 100b may monitor the operating state of a battery of the second system 100b and generate an event indicating that the system which is executing the predetermined process is to be switched from when the battery is driving.

The monitoring section 160a of the first system 100a monitors the hardware of the first system 100a being used by the processing section 120a of the first system 100a during execution of the predetermined process. The monitoring section 160a of the first system 100a may then generate an event indicating that the system which is executing the predetermined process is to be switched from in the case where a necessity to use hardware that does not exist in the first system 100a or hardware of the first system 100a that is faulty arises. Likewise, the monitoring section 160b of the second system 100b may monitor the hardware of the second system 100b being used by the processing section 120b of the second system 100b during execution of the predetermined process. The monitoring section 160b of the second system 100b may then generate an event indicating that the system which is executing the predetermined process is to be switched from in the case where a necessity to use hardware that does not exist in the second system 100b or hardware of the second system 100b that is faulty arises.

The monitoring section 160a of the first system 100a monitors the temperature of the hardware of the first system 100a being used by the processing section 120a of the first system 100a during execution of the predetermined process. The monitoring section 160a of the first system 100a may then generate an event indicating that the system which is executing the predetermined process is to be switched from when the temperature is higher than a predetermined value. Likewise, the monitoring section 160b of the second system 100b may monitor the temperature of the hardware of the second system 100b being used by the processing section 120b of the second system 100b during execution of the predetermined process. The monitoring section 160b of the second system 100b may then generate an event indicating that the system which is executing the predetermined process is to be switched from when the temperature is higher than a predetermined value. The predetermined value may be stored in the RAM or the HDD, for example.

The first system 100a may further include an input section 170a configured to receive from a user switching instruction information indicating that the system which is executing the predetermined process is to be switched from. The input section 170a is formed by an input device, for example. In such a case, the monitoring section 160a of the first system 100a may generate an event indicating that the system which is executing the predetermined process is to be switched from when the input section 170a receives the switching instruction information. Likewise, the second system 100b may further include an input section 170b configured to receive from a user switching instruction information indicating that the system which is executing the predetermined process is to be switched from. In such a case, the monitoring section 160b of the second system 100b may generate an event indicating that the system which is executing the predetermined process is to be switched from when the input section 170b receives the switching instruction information. When the user desires to work utilizing a system in quiet environments, for example, the user may input switching instruction information to switch from a system which consumes a large amount of power (or produces a large amount of heat) and for which it is necessary to operate a fan at a high speed in order to cool the system to a system which consumes a small amount of power (or produces a small amount of heat) and for which it is not necessary to operate a fan (or it is only necessary to operate a fan at a low speed) in order to cool the system. That is, it is possible to switch from a system that produces relatively large fan rotation noise to a system that produces relatively small fan rotation noise. In the case where the user desires to cause a system to execute high-speed processing, for example, the user may input switching instruction information to switch from a system with a relatively low processing speed to a system with a relatively high processing speed. In the case where the user desires not to reduce the remaining capacity of the battery very much, for example, the user may input switching instruction information to switch from a system with a relatively high power consumption to a system with a relatively low power consumption.

The first system 100a may further include a shared section 140a that is a portion of a hardware resource of the first system 100a to be shared with the second system 100b. The shared section 140a is assumed to be a keyboard or an LCD (Liquid Crystal Display), for example. The first system 100a may further include a communication section 110a that allows the processing section 120a to exchange data and an image file stored in the shared section 140a with the second system 100b, and an output section 150a configured to output results of execution of the predetermined process. Likewise, the second system 100b may further include a shared section 140b that is a portion of a hardware resource of the second system 100b to be shared with the first system 100a. The second system 100b may further include a communication section 110b that allows the processing section 120b to exchange data and an image file stored in the shared section 140b with the first system 100a, and an output section 150b configured to output results of execution of the predetermined process.

[1-3. Hardware Configuration of Sub System]

Figure 2:
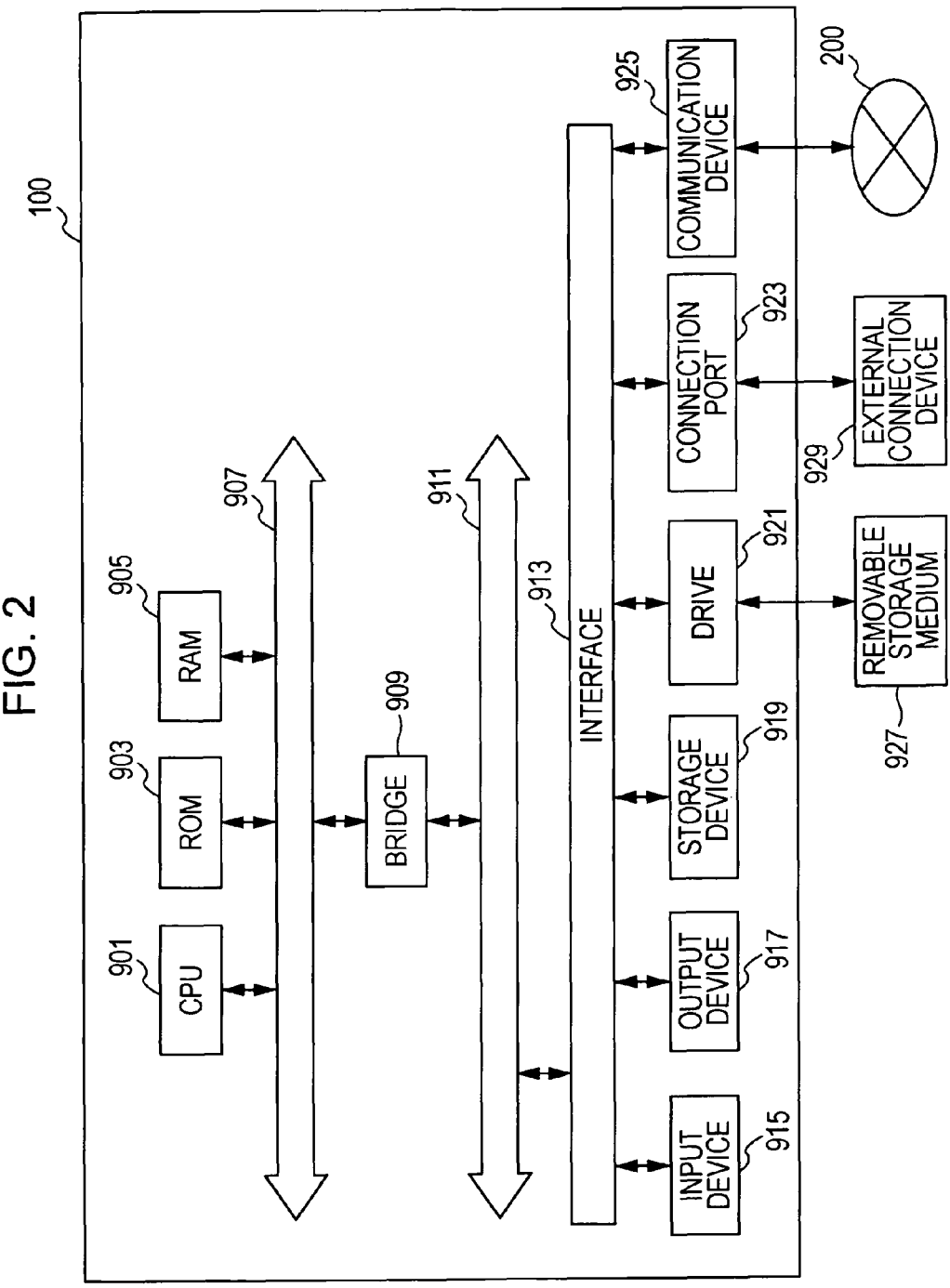
FIG. 2 shows a hardware configuration of a sub system according to the embodiment.

FIG. 2 shows a hardware configuration of a sub system according to the embodiment. The sub system is equivalent to each of the first system 100a and the second system 100b described above. While the first system 100a and the second system 100b are provided in separate housings connected via a network 200 in the illustrated embodiment, the present invention is not limited thereto as described above.

The sub system 100 (each of the first system 100a and the second system 100b) mainly includes a CPU 901, a ROM 903, a RAM 905, a host bus 907, a bridge 909, an external bus 911, an interface 913, an input device 915, an output device 917, a storage device 919, a drive 921, a connection port 923, and a communication device 925.

The CPU 901 functions as an arithmetic processing unit and a control device, and controls all or a part of operations performed in the sub system 100 in accordance with various programs stored in the ROM 903, the RAM 905, the storage device 919, or a removable storage medium 927. The ROM 903 stores programs, computation parameters, and so forth to be used by the CPU 901. The RAM 905 temporarily stores programs to be executed by the CPU 901, computation parameters that vary during the execution, and so forth. The ROM 903 and the RAM 905 are connected to each other through the host bus 907 formed by an internal bus such as a CPU bus.

The host bus 907 is connected via the bridge 909 to the external bus 911 such as a PCI (Peripheral Component Interconnect/Interface) bus.

The input device 915 is an operation unit operable by the user such as a mouse, a keyboard, a touch panel, a button, a switch, or a lever. The input device 915 may be a remote control unit (a so-called remote controller) that utilizes infrared rays or other radio waves, or an external connection device 929 that allows operation of the sub system 100 such as a cellular phone or a PDA, for example. The input device 915 further includes an input control circuit configured to generate an input signal on the basis of information input by the user using the operation unit described above and output the generated signal to the CPU 901. The user of the sub system 100 is allowed to input various data and a command for a process operation to the sub system 100 by operating the input device 915.

The output device 917 may be a display device such as a CRT display device, a liquid crystal display device, a plasma display device, an EL display device, or a lamp, a sound output device such as a speaker or headphones, or a device configured to visually or audibly inform the user of acquired information such as a printer device, a cellular phone, or a facsimile, for example. The output device 917 outputs results of various processes performed by the sub system 100, for example. Specifically, the display device displays results of various processes performed by the sub system 100 through text or images. Meanwhile, the sound output device converts an audio signal such as sound data played back into an analog signal to output the resulting analog signal.

The storage device 919 is a data storage device formed as an exemplary storage section of the sub system 100, and may be formed by a magnetic storage device such as an HDD (Hard Disk Drive), a semiconductor storage device, an optical storage device, or a magneto-optical storage device, for example. The storage device 919 stores programs to be executed by the CPU 901, various data, sound signal data and image signal data acquired from the outside, and so forth.

The drive 921 is a storage medium reader/writer built in or external to the sub system 100. The drive 921 reads out information stored in the removable storage medium 927 mounted to the drive 921 such as a magnetic disk, an optical disc, a magneto-optical disk, or a semiconductor memory to output the read information to the RAM 905. The drive 921 is also configured to write information in the removable storage medium 927 mounted to the drive 921 such as a magnetic disk, an optical disc, a magneto-optical disk, or a semiconductor memory. The removable storage medium 927 may be a DVD medium, an HD-DVD medium, a Blu-ray medium, a Compact Flash (CF: registered trademark), a Memory Stick, or an SD Memory Card (Secure Digital Memory Card), for example. The removable storage medium 927 may be an IC card (Integrated Circuit card) or an electronic device provided with a non-contact IC chip, for example.

The connection port 923 is a port configured to directly connect a device to the sub system 100 such as a USB (Universal Serial Bus) port, an IEEE 1394 port such as an i.LINK port, a SCSI (Small Computer System Interface) port, an RS-232C port, an optical audio terminal, and an HDMI (High-Definition Multimedia Interface) port, for example. The sub system 100 directly acquires sound signal data and image signal data from the external connection device 929 and provides sound signal data and image signal data to the external connection device 929 by connecting the external connection device 929 to the connection port 923.

The communication device 925 is a communication interface formed by a communication device for connection to the network 200, for example. The communication device 925 may be a communication card for wired or wireless LAN (Local Area Network), Bluetooth (registered trademark), or WUSB (Wireless USB), a router for optical communication, a router for ADSL (Asymmetric Digital Subscriber Line), or a modem for various types of communications, for example. The communication device 925 is configured to exchange a sound signal or the like with the Internet or other communication devices, for example. The network 200 to be connected to the communication device 925 is formed by a network connected with or without wires, and may be the Internet, a home LAN, an infrared communication network, a radio wave communication network, or a satellite communication network, for example.

An exemplary hardware configuration that enables implementation of the functions of the sub system 100 according to the embodiment of the present invention has been described above. The constituent elements described above may be formed using general-purpose members or by hardware specialized for the respective functions of the constituent elements. Thus, it is possible to appropriately change a hardware configuration to utilize in accordance with the technical level of each implementation of the embodiment.

[1-4. Virtualization Technology]

A virtualization technology is a technique for creating virtual hardware using software to run software such as an OS and an application on the created virtual hardware.

The term "virtual machine" refers to a collection of software and data that enables execution of an OS and an application in the same way as a physical computer. The virtual machine includes virtual devices such as a CPU, a memory, an HDD, and a network controller.

[1-5. Virtualization]

Figure 3B:
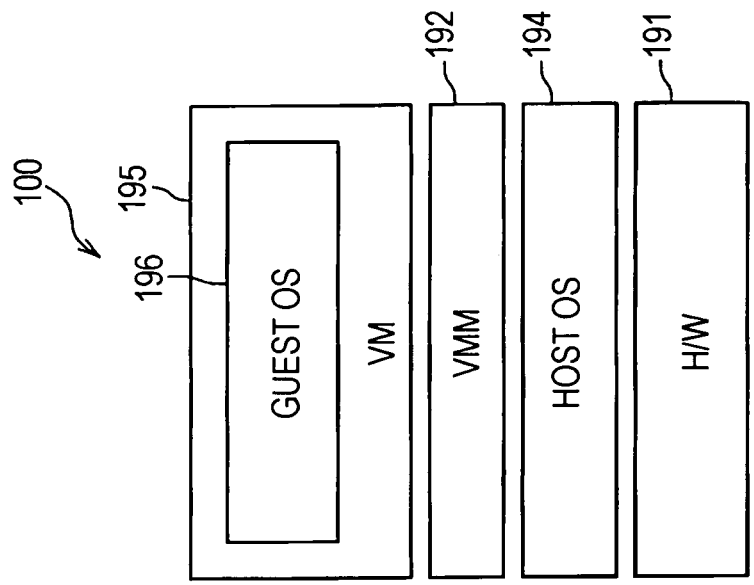
FIG. 3B shows a sub system of an application type, of two types of virtualization technologies.
Figure 3A:
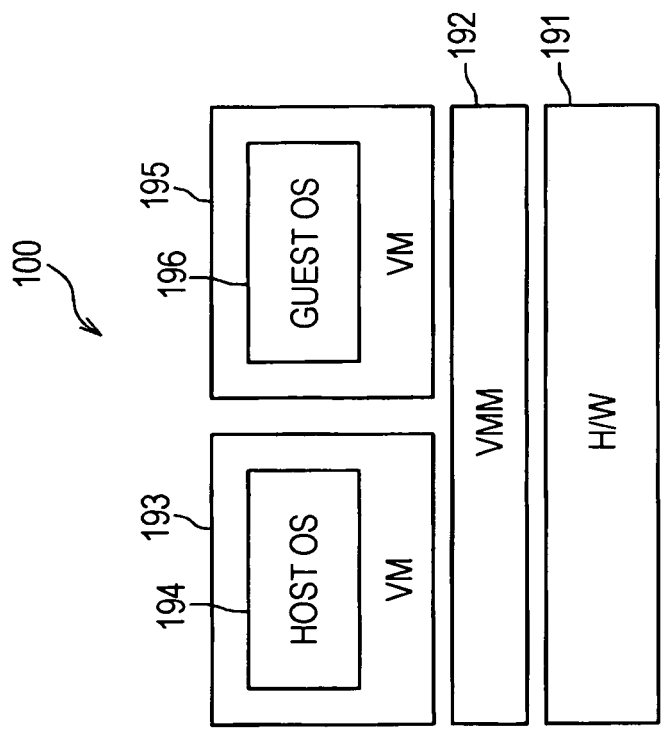
FIG. 3A shows a sub system of a hypervisor type, of two types of virtualization technologies.

There are two types of virtualization technologies commonly used in the PC world, namely a hypervisor type and an application type. FIGS. 3A and 3B show the two types of virtualization technologies. A sub system 100 of a hypervisor type shown in FIG. 3A includes HW (hardware) 191, a VMM 192, a VM 193 including a Host OS 194, and a VM 195 including a Guest OS 196. A sub system 100 of an application type shown in FIG. 3B includes HW (hardware) 191, a Host OS 194, a VMM 192, and a VM 195 including a Guest OS 196.

[1-6. Advantages of Virtualization]

An advantage of the virtualization is the provision of "compatibility" which allows execution of existing software. Other advantages provided by the virtualization include: "emulation" which allows setting up a virtual machine that is totally different from physical hardware serving as a base; "encapsulation" which allows a virtual machine to be handled as a group of files; "portability" which allows a virtual machine to be transferred from one location to another in the same way as other software files; "partitioning" which allows a plurality of virtual machines to be executed on a single physical machine; and "isolation" which allows respective virtual machines to behave as separate machines.

[1-7. Migration]

The term "migration" refers to transfer of a virtual machine from one host to another utilizing the "portability", which is one of the characteristics of a virtual machine described above. In the embodiment, the migration corresponds to transfer of an image file between the first system 100a and the second system 100b, for example. The term "live migration", which is a type of the migration, refers to transfer of a virtual machine being executed from one host to another without (substantially) suspending the execution. FIG. 4 is a schematic diagram showing migration of a VM from an LPSS 191a to an HPSS 191b.

[1-8. Dynamic Transfer of Execution Environments Employing Migration]

Dynamic Platform Switching will now be described. Dynamic Platform Switching is a technique achieved by applying a technique for dynamically transferring execution environments employing migration (live migration) to the embodiment. A virtual machine on which an OS is run is subjected to Dynamic Platform Switching (so-called "live migration") between an HPSS serving as an example of the first system 100a and an LPSS serving as an example of the second system 100b. In the description below, an HPSS and an LPSS are used as an example of the first system 100a and an example of the second system 100b, respectively.

In an example of Dynamic Platform Switching, it is assumed that an HPSS is used when the system is starting up and when a high load is imposed on the system, and that an LPSS is used when the system is idling and when the system is driven on a battery, for example. In another example, it is assumed that an HPSS is used only when necessary, for example in the case where an interface only supported by the HPSS such as an HDMI (High-Definition Multimedia Interface) is used. It is also assumed that a user runs a virtual machine on a Mobile PC when he/she is on a trip, and that the user runs the virtual machine on a Desktop PC when he/she is back. Such an arrangement may be implemented using a separate PC such as a Desktop PC or using a Dock.

[1-9. Constituent Elements of System Necessary for Implementation of Information Processing System]

In order to implement the information processing system 10 according to the embodiment, two or more sub systems that are different in power consumption/processing capacity are necessary as constituent elements of the system. Examples of the sub systems include a low power sub system (LPSS) and a high performance sub system (HPSS). The system may further include a communication unit (for example, the communication section 110) between the sub systems, a shared unit (for example, the shared section 140) that is an HW (hardware) resource to be shared between the sub systems, a unit for sharing a VM image (for example, an image file) between the sub systems, a switching event detection function (for example, a function of the monitoring section 160), and a sub system power control function.

[1-9-1. Two or More Sub Systems Different in Power Consumption/Processing Capacity]

The two or more sub systems that are different in power consumption/processing capacity are each configured to execute a Host OS and a VMM. The sub systems are configured such that while a first sub system is executing a VM, a second sub system may start up a Host OS and a VMM to receive migration from the first sub system. In order to achieve such a configuration, the sub systems each include a CPU, a chipset, and a memory. An HDD that stores a Host OS and a VMM may be shared between the sub systems depending on the configuration. Thus, the HDD does not necessarily belong to the sub systems.

[1-9-2. Communication Unit Between Sub Systems]

The communication unit (for example, the communication section 110) between the sub systems may support a communication scheme via an IP (Internet Protocol) network or a communication scheme that uses a virtual device such as that provided by a USB (Universal Serial Bus) client function. The communication unit between the sub systems is mainly used to allow the sub systems to share a VM snapshot or synchronize migration. The communication unit between the sub systems may also be used to allow a first sub system to utilize a shared resource of a second sub system and to allow the second sub system to utilize a shared resource of the first sub system.

[1-9-3. Unit for Sharing HW Resource Between Sub Systems]

In the information processing system 10 according to the embodiment, an HW configuration and a software program that provide a unit for sharing an HW resource through (1) to (4) below or a combination thereof are necessary.

(1) Use of a technique allowing one sub system to provide a function to the other via the communication unit between the sub systems. For example, a technique for providing a function through remote control in a server-client model (for example, providing a function in a server-client system) and a technique for providing a function through a virtual device such as that provided by a USB client function may be used.

(2) Use of a technique for connecting a device to a bus or a device accessible from each sub system. A connection through an i.LINK, a SCSI (Small Computer System Interface), or a LAN (Local Area Network), for example, is assumed. An arbitration controller that arbitrates between accesses from two sub systems may be used.

(3) Use of a technique for migration to a sub system to which an HW resource is connected. Migration to an HPSS to which an HW resource that does not exist in an LPSS is connected, for example, is assumed.

(4) Use of a technique for connecting an HW resource to a sub system that executes a VM using a switch.

[1-9-4. Unit for Sharing VM Image Between Sub Systems]

In the information processing system 10 according to the embodiment, an HW configuration and a software program that provide a unit for sharing a VM image through (1) to (3) below or a combination thereof are necessary.

(1) Use of a technique allowing one sub system to provide a snapshot to the other. For this option, use of a file server, use of a USB client function (a function allowing a sub system having a storage in which a VM image is saved to behave as a device to the other), and use of a file transfer (copy) function are assumed.

(2) Use of a technique for disposing a shared storage at a neutral position with respect to the sub systems. For this option, a connection through an i.LINK, a SCSI, or a LAN and use of an arbitration controller are assumed.

(3) Use of a technique allowing a sub system that executes a VM to occupy a storage by switching which sub system the storage is connected to using a switch.

[1-9-5. Switching Event Detection Function]

In the sub systems according to the embodiment, a software program for monitoring the load on the VM, the device used, a selection performed by the user through a software UI (User Interface), and so forth is executed as the switching event detection function (for example, a function of the monitoring section 160). Also, a software program for monitoring a selection performed by the user through a hardware UI (such as a mechanical switch), changes in power source (AC/Battery), the temperature of the system, changes in HPSS connection state (in the case of an HPSS separation type), and so forth is executed in components of the sub systems.

[1-9-6. Sub System Power Control Function]

In the sub systems according to the embodiment, a scheme or a software program for determining a state, such as whether or not a VM is being executed, to switch the operating state of the sub systems is necessary. When there is a sub system that is not executing a VM or that is not providing a function to the other sub system, the sub system may be turned off or switched into a power-saving mode to reduce the power consumption of the entire system. The sub system may be returned to a normal operating state when migration is performed and when the sub system provides a function to the other sub system.

[1-10. State Transition Diagram]

Figure 5:
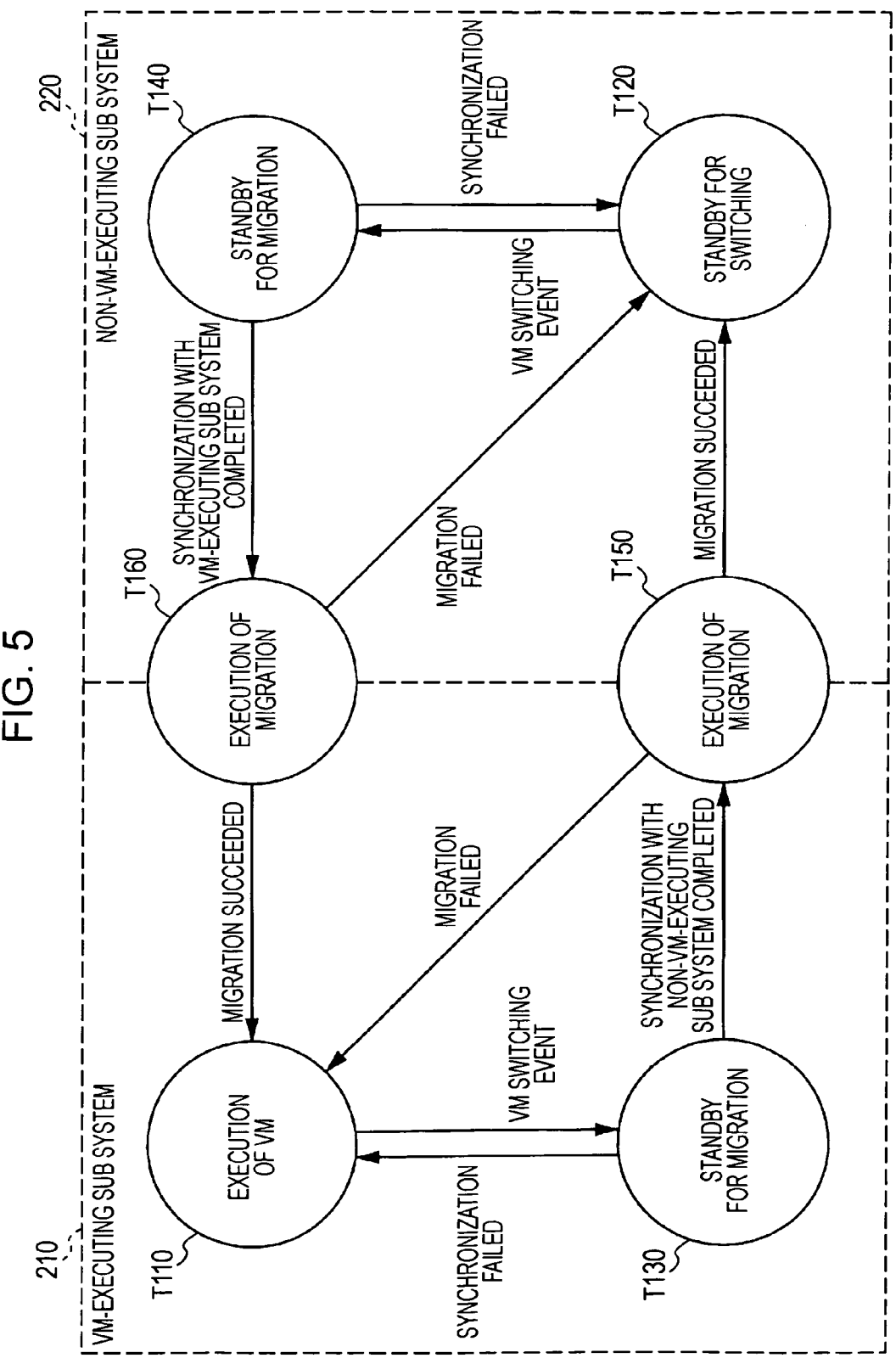
FIG. 5 is a state transition diagram between a VM-executing sub system and a non-VM-executing sub system.

FIG. 5 is a state transition diagram between a VM-executing sub system 210 and a non-VM-executing sub system 220. In the information processing system 10, a VM-executing sub system and a non-VM-executing sub system exist.

[1-10-1. Execution of VM]

In FIG. 5, "execution of VM T110" indicates a state in which a VM is being executed. If a function provided by the other sub system is available in "execution of VM T110", such a function may be utilized via a communication function between the sub systems. If a switching event is detected in "execution of VM T110", the VM-executing sub system 210 transitions into "standby for migration T130".

[1-10-2. Standby for Migration (VM-Executing Sub System 210)]

In FIG. 5, "standby for migration T130 (VM-executing sub system 210)" indicates a state in which the VM-executing sub system 210 prepares for migration and waits for the other sub system to transition into "standby for migration T130". When communication with the migration-destination sub system is established to achieve synchronization, the VM-executing sub system 210 transitions into "execution of migration T150". When communication with the migration-destination sub system is not established, the VM-executing sub system 210 transitions into "execution of VM T110".

[1-10-3. Standby for Migration (Non-VM-Executing Sub System 220)]

In FIG. 5, "standby for migration T140 (non-VM-executing sub system 220)" is a state in which the non-VM-executing sub system 220 returns from a power-saving state or a power-off state. In this state, the non-VM-executing sub system 220 prepares to receive migration and waits for the other sub system to transition into "standby for migration T130". When communication with the migration-origin sub system is established to achieve synchronization, the non-VM-executing sub system 220 transitions into "execution of migration T160". When communication with the migration-origin sub system is not established, the non-VM-executing sub system 220 transitions into "standby for switching T120".

[1-10-4. Execution of Migration (VM-Executing Sub System 210)]

In FIG. 5, "execution of migration (T150)" is a state in which the VM is suspended and saved. In order to reduce the time for which the VM is suspended, VM data may be transferred to the non-VM-executing sub system 220 differentially (live migration). If the migration is completed successfully, the VM-executing sub system 210 transfers the HW resource which it has been occupying to the migration-destination sub system. If the migration fails, the VM-executing sub system 210 transitions into "execution of VM T110".

[1-10-5. Execution of Migration (Non-VM-Executing Sub System 220)]

In FIG. 5, "execution of migration (T160)" is a state in which the VM is read and executed. In order to reduce the time for which the VM is suspended, VM data may be received from the VM-executing sub system 210 differentially (live migration). If the migration is completed successfully, the non-VM-executing sub system 220 receives the HW resource which has been occupied by the migration-origin sub system. If the migration fails, the non-VM-executing sub system 220 transitions into "standby for switching T120".

[1-10-6. Flow of Migration]

The processes of migration are executed sequentially in the order of "start of migration", "suspension of virtual machine (migration origin)", "transfer of data on virtual machine (from migration origin to migration destination)", and "resumption of virtual machine (migration destination)", for example.

[1-10-6. Flow of Live Migration]

The processes of live migration are executed sequentially in the order of "start of migration", "transfer of data on virtual machine (from migration origin to migration destination)", "differential transfer (from migration origin to migration destination)", "repetition of differential transfer until the difference is sufficiently small", "suspension of virtual machine (migration origin)", "differential transfer (from migration origin to migration destination)", and "resumption of virtual machine (migration destination)".

[1-10-8. Standby for Switching]

In FIG. 5, "standby for switching T120" is a state in which the non-VM-executing sub system 220 waits for a switching event. In this state, the non-VM-executing sub system 220 is turned off, in a power-saving state, or providing a function of its own HW resource to the VM-executing sub system. If a switching event is detected in this state, the non-VM-executing sub system 220 transitions into "standby for migration T140".

[1-11. First Exemplary System Configuration]

Figure 6:
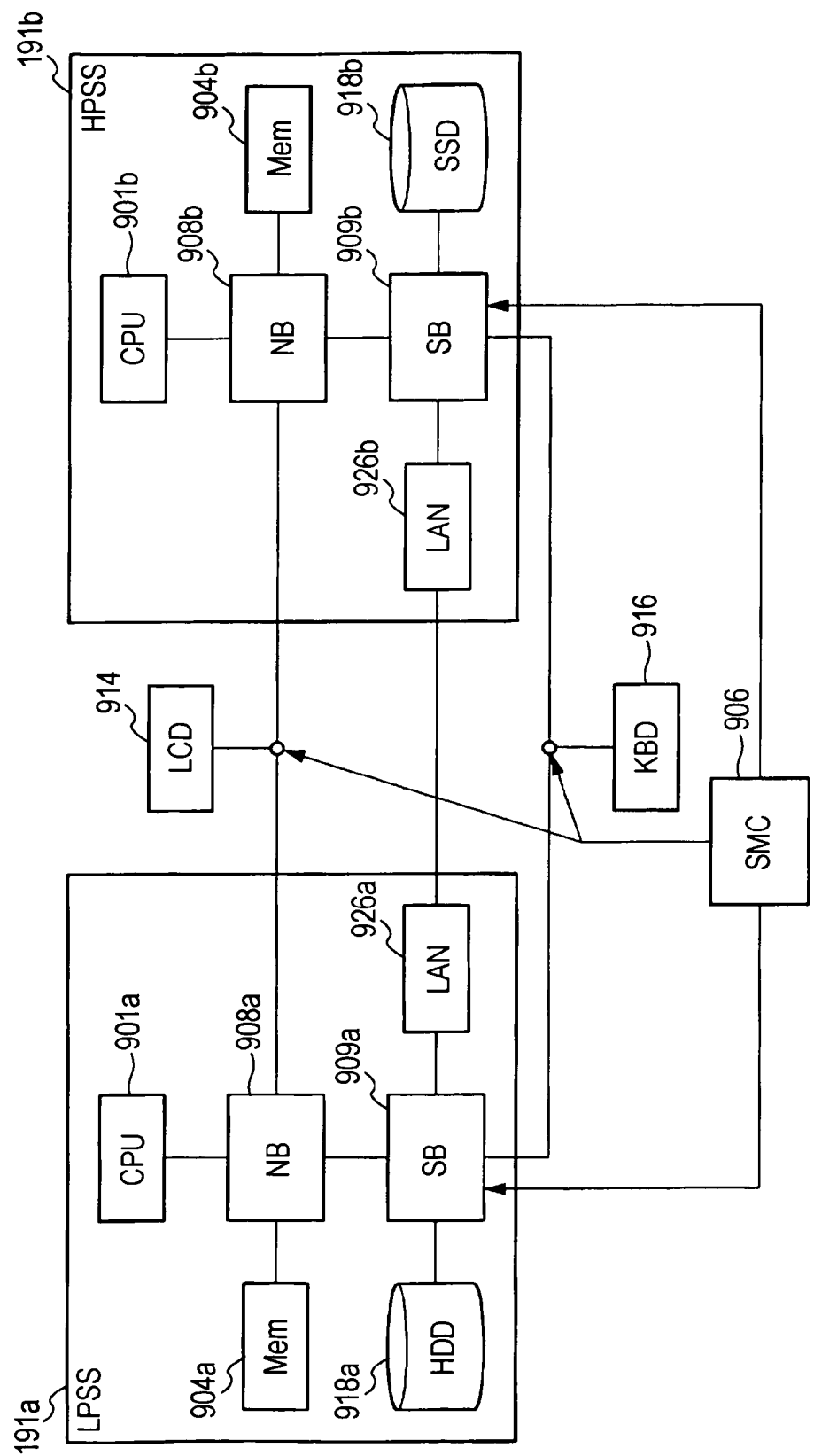
FIG. 6 shows a first exemplary system configuration of the information processing system according to the embodiment.

FIG. 6 shows a first exemplary system configuration of the information processing system according to the embodiment. As shown in FIG. 6, the LPSS 191*a* includes a CPU 901*a*, a Mem (Memory) 904*a*, an NB (North Bridge) 908*a*, an SB (South Bridge) 909*a*, an HDD 918*a*, and a LAN 926*a*. The HPSS 191*b* includes a CPU 901*b*, a Mem 904*b*, an NB 908*b*, an SB 909*b*, an SSD (Solid State Drive) 918*b*, and a LAN 926*b*. The LPSS 191*a* and the HPSS 191*b* are connected through the LANs 926*a* and 926*b*. The HDD 918*a* of the LPSS 191*a* stores a Host OS, a VMM, and a VM image of the LPSS 191*a*. The SSD 918*b* of the HPSS 191*b* stores a Host OS and a VMM of the HPSS 191*b*. The HPSS 191*b* accesses the HDD 918*a* via the LAN 926*b*. The LPSS 191*a* communicates with the HPSS 191*b* via the LAN 926*a*. The LPSS 191*a* informs an SMC (System Management Controller) 906 of a switching timing. The SMC 906 switches with a bus switch which sub system a KBD (Keyboard) 916 and an LCD 914 are connected to in sync with Platform Switching. The SMC 906 controls power supply to the HPSS 191*b*.

[1-12. Second Exemplary System Configuration]

Figure 7:
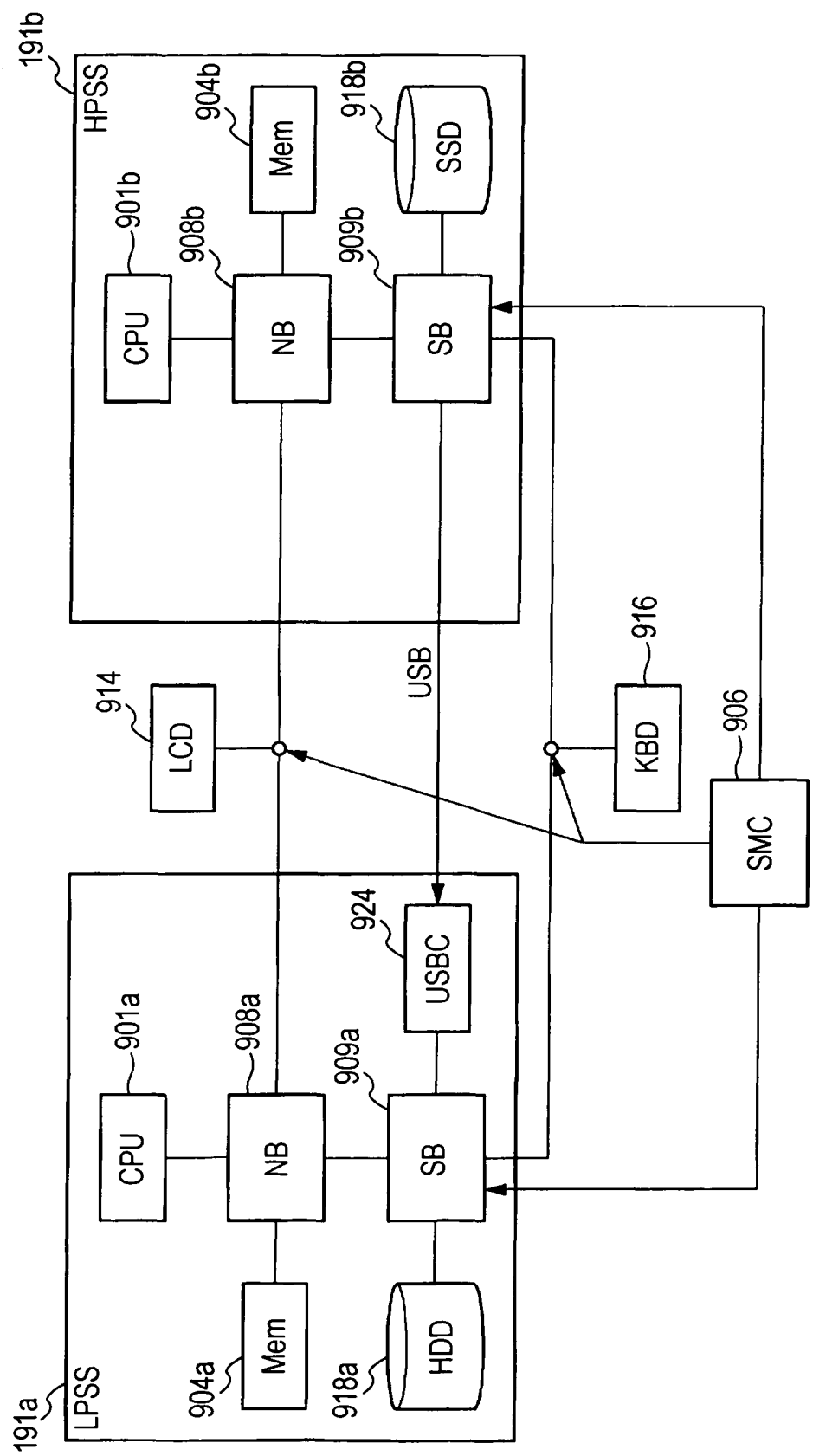
FIG. 7 shows a second exemplary system configuration of the information processing system according to the embodiment.

FIG. 7 shows a second exemplary system configuration of the information processing system according to the embodiment. As shown in FIG. 7, the LPSS 191*a* and the HPSS 191*b* are connected through a USB. The LPSS 191*a* operates as a USB Client (USBC 924). The HDD 918*a* of the LPSS 191*a* stores a Host OS, a VMM, and a VM image of the LPSS 191*a*. The SSD 918*b* of the HPSS 191*b* stores a Host OS and a VMM of the HPSS 191*b*. The HPSS 191*b* accesses the HDD 918*a* via the USB. The LPSS 191*a* communicates with the HPSS 191*b* via the USB. The LPSS 191*a* informs an SMC 906 of a switching timing. The SMC 906 switches with a bus switch which sub system a KBD 916 and an LCD 914 are connected to in sync with Platform Switching. The SMC 906 controls power supply to the HPSS 191*b*.

[1-13. Switching from LPSS to HPSS]

In order to shorten the time from generation of an event requesting Platform Switching to start of migration, it is necessary to start up the HPSS 191*b* in as short a time as possible after the generation of the event. The HPSS 191*b* becomes ready quickly if it is placed in standby during operation of the LPSS 191*a*. In the case where it is permitted to take time until the HPSS 191*b* becomes ready and it is desired to reduce power consumption during operation of the LPSS 191*a* even if only slightly, the HPSS 191*b* may be turned off to save more power.

[1-14. First Flow of Switching]

Figure 8:
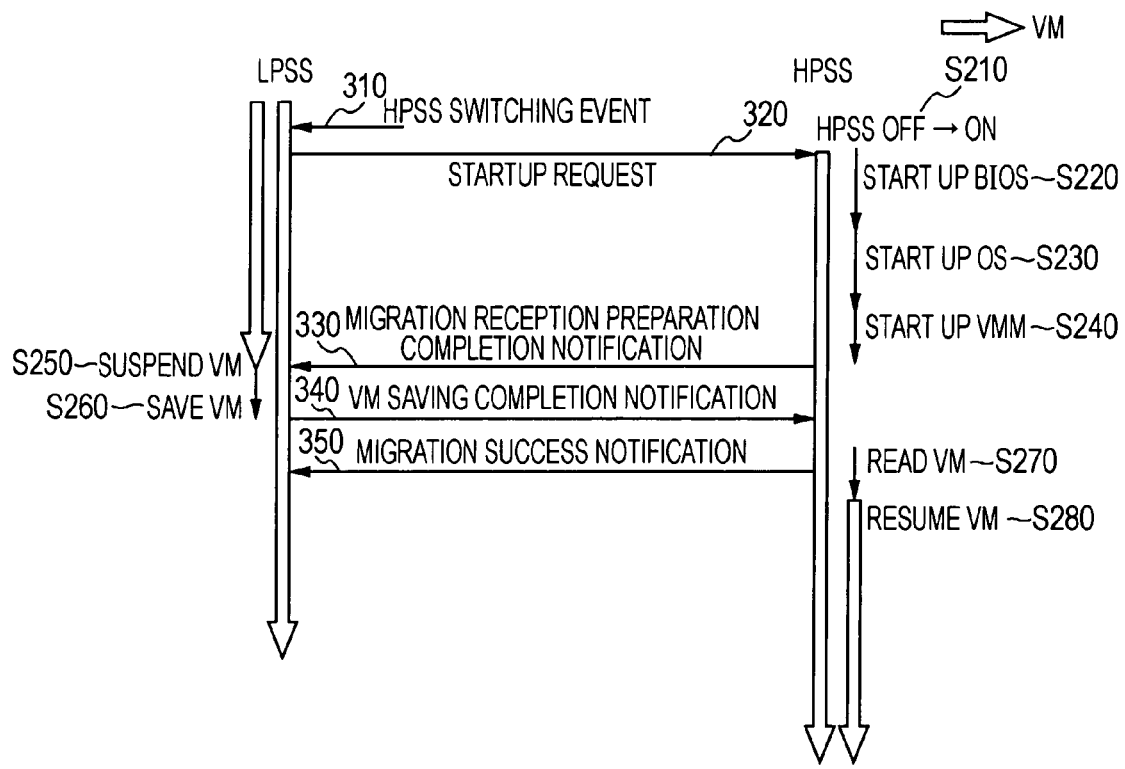
FIG. 8 shows a first flow of switching of a VM-executing sub system.

FIG. 8 shows a first flow of switching of a VM-executing sub system. FIG. 8 illustrates a case where the HPSS is turned off during operation of the LPSS. When the LPSS detects generation of an HPSS switching event (310), the LPSS transmits a startup request (320) to the HPSS. When the HPSS receives the startup request (320), the HPSS turns on from the off state (step S210), starts up its BIOS (step S220), starts up its OS (step S230), and starts up its VMM (step S240). After the HPSS starts up, it transmits a migration reception preparation completion notification (330) to the LPSS. When the LPSS receives the migration reception preparation completion notification (330), the LPSS suspends its VM (step S250), saves the VM (step S260), and transmits a VM saving completion notification (340). When the HPSS receives the VM saving completion notification (340), the HPSS reads the VM migrated from the LPSS (step S270), resumes the read VM (step S280), and transmits a migration success notification (350). After the LPSS receives the "migration success notification" (350) from the HPSS, the LPSS may transition into "standby for switching" or a suspended state.

[1-15. Second Flow of Switching]

Figure 9:
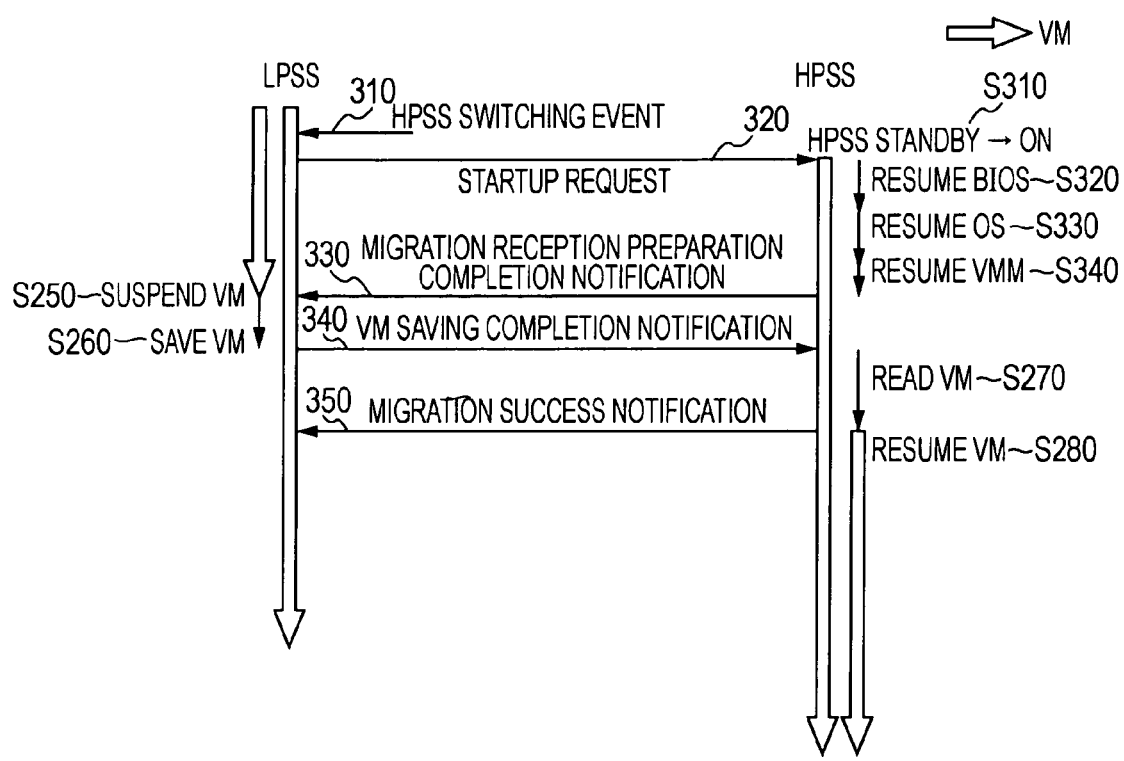
FIG. 9 shows a second flow of switching of a VM-executing sub system.

FIG. 9 shows a second flow of switching of a VM-executing sub system. FIG. 9 illustrates a case where the HPSS is placed in standby during operation of the LPSS. When the HPSS receives the startup request (320), the HPSS turns on from the standby state (step S310), resumes its BIOS (step S320), resumes its OS (step S330), and resumes its VMM (step S340). Other processes are the same as the processes shown in FIG. 8. After the LPSS receives the "migration success notification" (350) from the HPSS, the LPSS may transition into "standby for switching" or a suspended state.

[1-16. First Example of Sharing HDD for VM Image]

Figure 10:
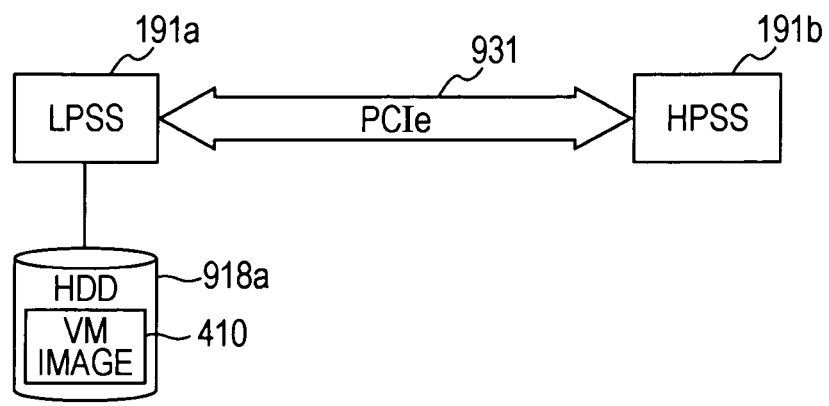
FIG. 10 shows a first example of sharing a HDD for a VM image.

FIG. 10 shows a first example of sharing a HDD for a VM image. As shown in FIG. 10, the LPSS 191*a* and the HPSS 191*b* are connected through a local bus such as a PCIe (PCI Express) 931, for example. The HDD 918*a* is connected to the LPSS 191*a*. A VM image 410 is stored in the HDD 918*a*. The HPSS 191*b* uses the HDD 918*a* via the LPSS 191*a*. The LPSS 191*a* may behave as a device connected through the local bus to the HPSS 191*b*, and vice versa. The LPSS 191*a* and the HPSS 191*b* may use the local bus as a network.

[1-17. Second Example of Sharing HDD for VM Image]

Figure 11:
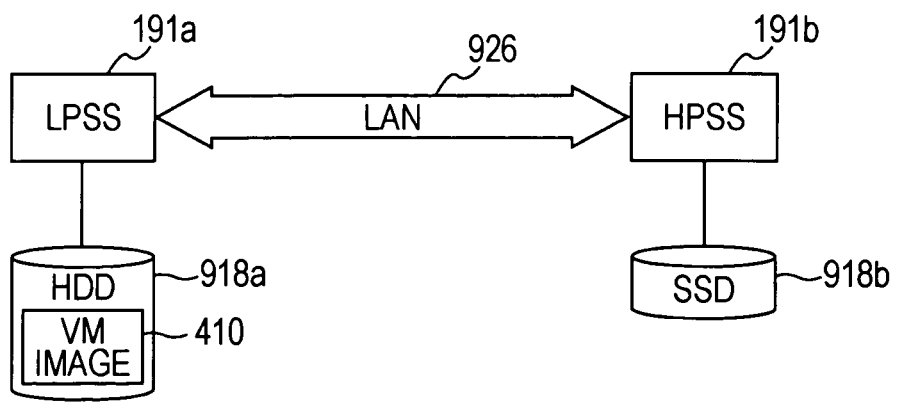
FIG. 11 shows a second example of sharing a HDD for a VM image.

FIG. 11 shows a second example of sharing a HDD for a VM image. As shown in FIG. 11, the LPSS 191*a* and the HPSS 191*b* are connected through a network such as a LAN (Local Area Network) 926, for example. The HDD 918*a* is connected to the LPSS 191*a*. A VM image 410 is stored in the HDD 918*a*. The HPSS 191*b* accesses the VM image 410 via the network. The Host OS and the VMM of the LPSS 191*a* are stored in the HDD 918*a*. Preferably, the HPSS 191*b* also includes a storage such as the SSD 918*b* with a certain capacity to be used for storage or virtual storage of the Host OS and the VMM of the HPSS 191*b*.

[1-18. Third Example of Sharing HDD for VM Image]

Figure 12:
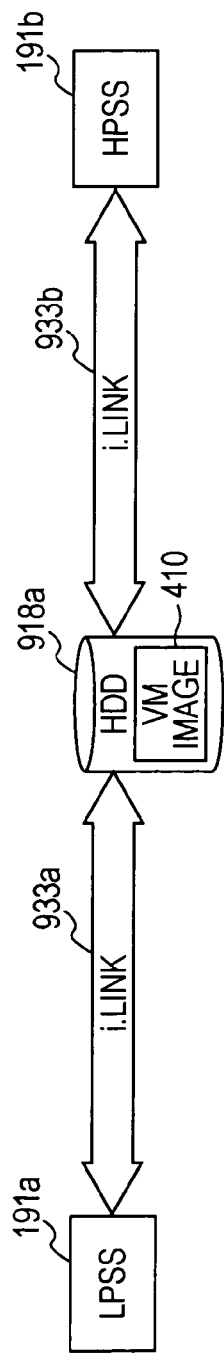
FIG. 12 shows a third example of sharing a HDD for a VM image.

FIG. 12 shows a third example of sharing a HDD for a VM image. As shown in FIG. 12, the LPSS 191*a* and the HDD 918*a* are connected through an i.LINK (IEEE 1394) 933*a*, and the HPSS 191*b* and the HDD 918*a* are connected through an i.LINK 933*b*. A VM image 410 is stored in the HDD 918*a*. Both the LPSS 191*a* and the HPSS 191*b* access the HDD 918*a* using a protocol of the i.LINKs 933*a* and 933*b*. According to the example, the HDD 918*a* may be used for storage of the Host OS and the VMM of each of the LPSS 191*a* and the HPSS 191*b*. The i.LINKs 933*a* and 933*b* may also be used for communication between the LPSS 191*a* and the HPSS 191*b*. Each of the i.LINKs 933*a* and 933*b* may be replaced with a SCSI, an SAS, an iSCSI, a LAN, or the like.

[1-19. Fourth Example of Sharing HDD for VM Image]

Figure 13:
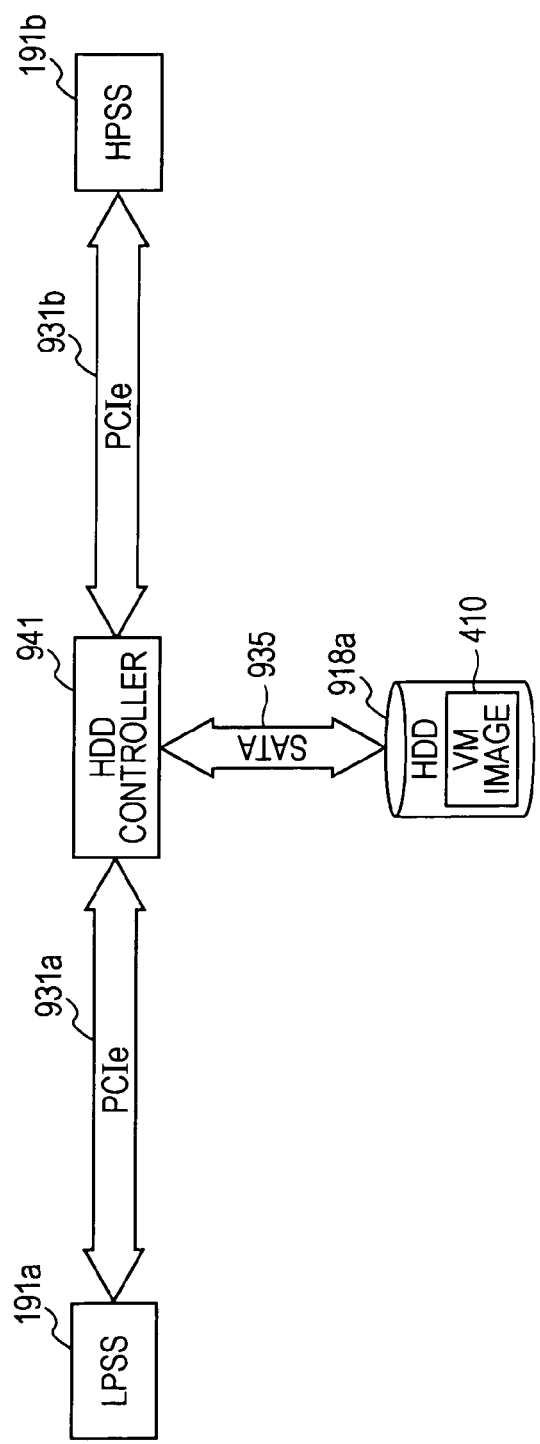
FIG. 13 shows a fourth example of sharing a HDD for a VM image.

FIG. 13 shows a fourth example of sharing a HDD for a VM image. As shown in FIG. 13, the HDD 918*a* is connected to an HDD Controller 941 having a function for arbitrating between accesses from the LPSS 191*a* and the HPSS 191*b*. A SATA (Serial ATA) 935 may be used for connection between the HDD Controller 941 and the HDD 918*a*. In order to synchronize the LPSS 191*a* and the HPSS 191*b* during Platform Switching, a communication unit between the LPSS 191*a* and the HPSS 191*b* is necessary. The function of the communication unit may be provided by the HDD Controller 941. The HDD Controller 941 and the LPSS 191*a* may be connected through a PCIe (PCI Express) 931*a* or the like. The HDD Controller 941 and the HPSS 191*b* may be connected through a PCIe (PCI Express) 931*b* or the like.

[1-20. Fifth Example of Sharing HDD for VM Image]

Figure 14:
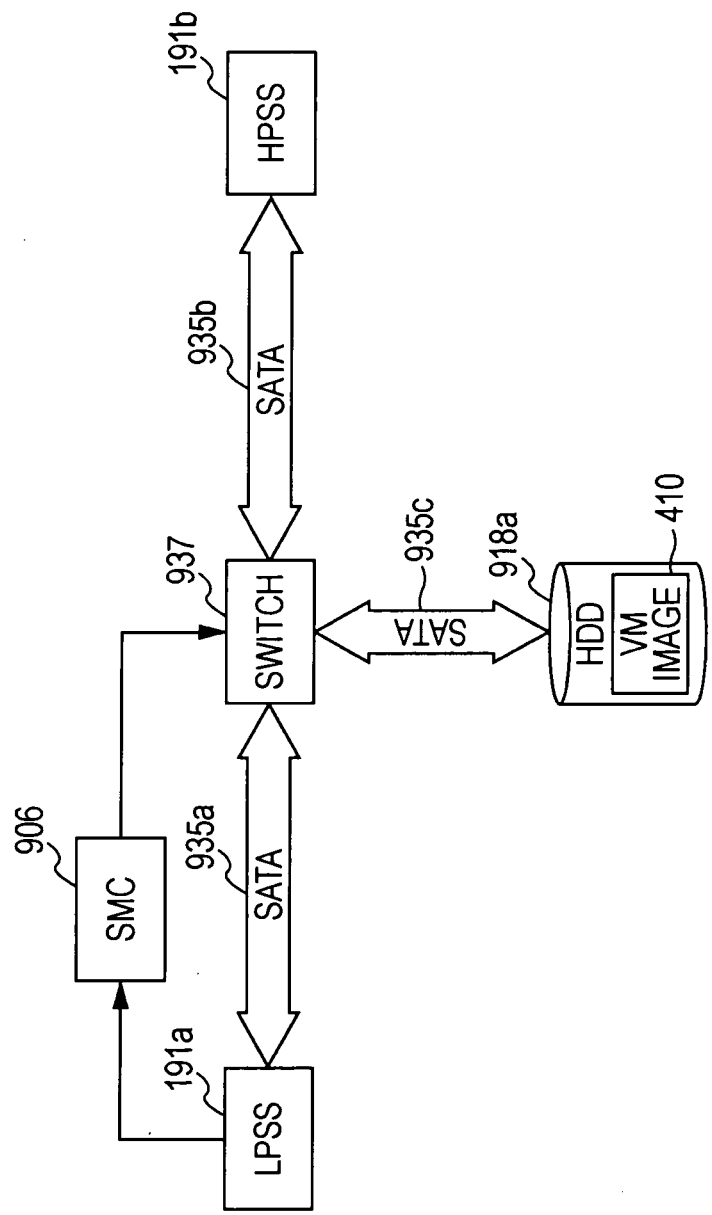
FIG. 14 shows a fifth example of sharing a HDD for a VM image.

FIG. 14 shows a fifth example of sharing a HDD for a VM image. As shown in FIG. 14, the LPSS 191*a* and the HPSS 191*b* and the HDD 918*a* are connected through SATAs (Serial ATAs) 935*a*, 935*b*, and 935*c*. A bus switch (Switch 937) is used to determine which of the LPSS 191*a* and the HPSS 191*b* to connect the HDD 918*a* to. In order to synchronize the LPSS 191*a* and the HPSS 191*b* during Platform Switching, a separate communication unit between the LPSS 191*a* and the HPSS 191*b* is necessary.

[1-21. Case where Sub Systems do not Support Same Instruction Set]

A case where the respective CPUs of the LPSS and the HPSS do not support the same instruction set is described. There may be a case where the respective CPUs of the LPSS and the HPSS do not support the same function or instruction set. Even in the case where the CPUs do not support the same function or instruction set, however, it is possible to apply the embodiment using an emulation technique. For example, when an x86 CPU executes an ineffective command, an exception (interrupt) occurs. In this case, the virtual machine monitor checks what command the interrupt process is attempting to execute in order to emulate the command.

It is also conceivable to prepare a virtual machine in accordance with a sub system that supports a smaller number of functions and instruction sets.

It is assumed, for example, that the LPSS supports x86 (x86, 32 bits) only and the HPSS supports x64 (x86, 64 bits) in addition to x86, and that 64-bit Windows (registered trademark) 7 is used as the OS on the virtual machine. In such a case, 64-bit commands, which are to be emulated by the LPSS, are executed frequently. However, it is possible for even the LPSS to achieve satisfactory performance by choosing such a CPU of the LPSS that allows execution of such 64-bit commands without emulation.

[1-22. Future Prospect]

A service called a "virtualization appliance" is spreading as a virtualization technology employed on the server side. In the service, a VM image located on a server is executed on the server or a client. The virtualization appliance may be considered as an LPSS or an HPSS in a broad sense. If the VM and the virtualization appliance service are compatible with each other, migration may be performed between the VM and the virtualization appliance service. This is considered to make it possible to use a VM through a virtualization appliance, which is a network service, even when there are no VM execution environments, and to increase the scalability of performance with a virtualization server.

While a preferred embodiment of the present invention has been described with reference to the accompanying drawings, the present invention is not limited thereto. It is apparent to those skilled in the art that various changes and modifications may be made without departing from the scope of the appended claims. It is understood as a matter of course that such changes and modifications should be construed as belonging to the technical scope of the present invention.

What is claimed is:

1. An information processing system, comprising:
    a first system, comprising:
        a first hardware;
        a first compensation section; and
        a first processing section configured to execute a determined process; and
    a second system, comprising:
        a second hardware that is different from the first hardware;
        a second compensation section; and
        a second processing section configured to execute the determined process wherein the first compensation section of the first system is further configured to:
        compensate for differences between the first hardware of the first system and the second hardware of the second system; and
        provide the first processing section of the first system with at least one execution environment of the first plurality of execution environments which is unaffected by the differences, and
    wherein the second compensation section of the second system is further configured to:
    compensate for the differences; and
    provide the second processing section of the second system with at least one execution environment of the second plurality of the execution environments which are unaffected by the differences, and
    wherein based on a completion of a migration of the determined process from the second system to the first system, the first system is configured to receive a hardware resource occupied by the second system prior to the completion of the migration of the determined process.

2. The information processing system according to claim 1, wherein the first system further comprises a first monitoring section configured to:
   monitor a magnitude of a load imposed on the first hardware of the first system; and
   generate an event based on the magnitude of the load that is larger than a determined value.

3. The information processing system according to claim 1, wherein the second system further comprises a second monitoring section configured to:
   monitor a magnitude of a load imposed on the hardware of the second system; and
   generate an event based on the magnitude of the load that is smaller than a determined value.

4. The information processing system according to claim 1, wherein the second system further comprises a second monitoring section configured to:
   monitor an operating state of the second hardware of the second system; and
   generate an event based on the second hardware of the second system that is idle.

5. The information processing system according to claim 1, wherein the second system further comprises a second monitoring section configured to:
   monitor an operating state of a battery of the second system; and
   generate an event based on the battery that drives or powers the second system.

6. The information processing system according to claim 1, wherein the first system further comprises a first monitoring section configured to:
   monitor the first hardware of the first system that is used by the first processing section of the first system for execution of the determined process; and
   generate an event based on a necessity to use a different hardware that is non-existent in the first system or the first hardware of the first system that is faulty.

7. The information processing system according to claim 1, wherein the first system further comprises a first monitoring section configured to:
   monitor a temperature of the first hardware of the first system that is used by the first processing section of the first system for execution of the determined process; and
   generate an event based on the temperature that is higher than a determined value.

8. The information processing system according to claim 1, wherein the first system further comprises:
   an input section configured to receive from a user, an input of switching instruction information to switch the first system or the second system which executes the determined process to the second system or the first system respectively; and
   a first monitoring section configured to generate an event based on the input section that receives the switching instruction information.

9. The information processing system according to claim 1, wherein the first system and the second system are arranged within a same housing.

10. The information processing system according to claim 1,
    wherein the first system further comprises a first monitoring section configured to detect an occurrence of an event based on the determined process that is in standby,
    wherein the first processing section of the first system is further configured to:
       receive an image file from the second system; and
       cause the first hardware of the first system to store data contained in the received image file prior to the migration for execution of the determined process by the processing section of the first system at a time of the migration.

11. The information processing system according to claim 10,
    wherein the second system further comprises a second monitoring section configured to detect the occurrence of the event based on the determined process that is in standby,
    wherein the second processing section of the second system is further configured to:
       receive an image file from the first system; and
       cause the second hardware of the second system to store data contained in the received image file prior to the migration for execution of the determined process by the processing section of the second system at a time of the migration.

12. The information processing system according to claim 1, wherein the first system and the second system are configured such that while one of the first system or the second system operates, other one of the first system or the second system is placed in a standby mode.

13. The information processing system according to claim 1, wherein the first system and the second system are connected by a USB (Universal Serial Bus).

14. The information processing system according to claim 1,
    wherein the first system further comprises:
       a first monitoring section configured to detect occurrence of a first event to switch the first system which executes the determined process to the second system,
       the first processing section of the first system further configured to:
          extract data stored in the first hardware that is used in the execution of the determined process, based on the first monitoring section that detects the occurrence of the first event at a time of execution of the determined process; and
          generate a first image file that contains the extracted data to output the generated first image file to the second system for resumption of execution of the determined process by the second system; and
    wherein the second system further comprises:
       a second monitoring section configured to detect occurrence of a second event to switch the second system which executes the determined process to the first system, and
       wherein the second processing section of the second system is further configured to:
          extract data stored in the second hardware that is used in the execution of the determined process, based on the second monitoring section that detects the occurrence of the second event at a time of execution of the determined process; and
          generate a second image file that contains the extracted data to output the generated second image file to the first system for resumption of execution of the determined process by the first system.

15. The information processing system according to claim 14, wherein the first system is configured to execute a virtual machine (VM), and the second system is configured to start an operating system (OS) and a virtual machine monitor (VMM) to output the generated second image file to the first system for the resumption of execution of the determined process.

16. The information processing system according to claim 1, wherein
the first hardware of the first system has a lower processing speed than the second hardware of the second system, and
the second hardware of the second system has a higher power consumption than the first hardware of the first system.

* * * * *